United States Patent
Hu et al.

(10) Patent No.: US 12,225,481 B2
(45) Date of Patent: Feb. 11, 2025

(54) TRANSMISSION POWER CONTROL FOR DISTRIBUTED-TONE RESOURCE UNITS AND MULTI-RESOURCE UNITS IN 6GHZ LOW-POWER INDOOR SYSTEMS

(71) Applicant: MediaTek Singapore Pte. Ltd., Singapore (SG)

(72) Inventors: Shengquan Hu, San Jose, CA (US); Jianhan Liu, San Jose, CA (US); Gary A. Anwyl, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 237 days.

(21) Appl. No.: 17/695,181

(22) Filed: Mar. 15, 2022

(65) Prior Publication Data
US 2022/0312345 A1 Sep. 29, 2022

Related U.S. Application Data

(60) Provisional application No. 63/200,632, filed on Mar. 19, 2021.

(51) Int. Cl.
*H04W 52/36* (2009.01)
*H04W 52/24* (2009.01)
(Continued)

(52) U.S. Cl.
CPC ....... *H04W 52/367* (2013.01); *H04W 52/242* (2013.01); *H04W 80/02* (2013.01); *H04W 84/10* (2013.01)

(58) Field of Classification Search
CPC . H04W 84/12; H04W 72/0453; H04W 72/23; H04W 72/21; H04W 74/0808; H04W 72/04; H04W 74/006; H04W 74/0816; H04W 88/08; H04W 72/0446; H04W 74/04; H04W 74/08; H04W 28/065; H04W 52/146; H04W 72/20;
(Continued)

(56) References Cited

U.S. PATENT DOCUMENTS

2018/0035387 A1\* 2/2018 Yang .................. H04W 52/243
2018/0316467 A1\* 11/2018 Zhu ..................... H04L 27/2603
(Continued)

*Primary Examiner* — Golam Sorowar
(74) *Attorney, Agent, or Firm* — Andy M. Han; Han IP PLLC

(57) ABSTRACT

Various schemes pertaining to transmission power control (TPC) for distributed-tone resource units (dRUs) and distributed multi-resource units (dMRUs) in 6 GHz low-power indoor (LPI) systems are described. A communication entity distributes subcarriers of a resource unit (RU) and a multi-RU over a physical-layer protocol data unit (PPDU) bandwidth or a frequency subblock of a bandwidth to generate a dRU and a dMRU associated with an uplink (UL) trigger-based (TB) PPDU comprising at least an extremely-high-throughput (EHT) short training field (EHT-STF), an EHT long training field (EHT-LTF), and a payload of data. The communication entity then transmits the dRU or dMRU associated with the UL TB PPDU with transmission power control such that symbols associated with the EHT-STF are transmitted with a first power and symbols associated with the EHT-LTF and the payload are transmitted with a second power.

15 Claims, 10 Drawing Sheets

(51) Int. Cl.
*H04W 80/02* (2009.01)
*H04W 84/10* (2009.01)

(58) Field of Classification Search
CPC ....... H04W 74/06; H04W 4/70; H04W 72/51;
H04W 72/541; H04L 5/0053; H04L
5/0044; H04L 27/26; H04L 27/2602;
H04L 5/0048; H04L 5/0055; H04L
5/0007; H04L 27/2603; H04L 5/0023;
H04L 27/2613; H04L 1/1614; H04L
27/26025; H04L 5/001; H04L 1/00; H04L
5/0091; H04L 27/26132; H04L 5/0037;
H04L 1/1685; H04L 1/0025
See application file for complete search history.

(56) References Cited

U.S. PATENT DOCUMENTS

| | | | |
|---|---|---|---|
| 2021/0288768 A1* | 9/2021 | Yang | H04L 5/0044 |
| 2024/0080824 A1* | 3/2024 | Park | H04L 5/0094 |
| 2024/0172208 A1* | 5/2024 | Park | H04L 5/0053 |

* cited by examiner

STA Tx Power (dBm) of local-RU, -1dBm/MHz

| | #Tone | Occupied BW (MHz) | TxPwr(dBm) |
|---|---|---|---|
| RU26 | 26 | 2.03 | 2.08 |
| RU52 | 52 | 4.06 | 5.09 |
| RU78 (26+52) | 78 | 6.09 | 6.85 |
| RU106 | 106 | 8.28 | 8.18 |
| RU132 (26+106) | 132 | 10.31 | 9.13 |
| RU242 | 242 | 18.91 | 11.77 |
| RU484 | 484 | 37.81 | 14.78 |
| RU996 | 996 | 77.81 | 17.91 |

Max Transmission Power for dRU/dMRU in 6GHz LPI

| | dRU on BW20 | dRU on BW40 | dRU on BW80 | dRU on BW160 |
|---|---|---|---|---|
| RU26 | 10.21 | 13.22 | 13.22 | 13.22 |
| RU52 | 11.46 | 13.22 | 16.23 | 16.23 |
| RU78 (26+52) | 11.00 | 13.22 | 14.98 | 17.99 |
| RU106 | 11.74 | 14.55 | 16.31 | 19.32 |
| RU132 (26+106) | 11.24 | 14.25 | 17.26 | 20.27 |
| RU242 | NA | 14.46 | 16.89 | 19.90 |
| RU484 | NA | NA | 17.47 | 19.90 |
| RU996 | NA | NA | NA | 20.60 |

Distribution Gain

| | BW20 | | | BW40 | | | BW80 | | | BW160 | | |
|---|---|---|---|---|---|---|---|---|---|---|---|---|
| | #Tone/MHz | Power Boost (dB) | | #Tone/MHz | Power Boost (dB) | | #Tone/MHz | Power Boost (dB) | | #Tone/MHz | Power Boost (dB) | |
| RU26 | 2 | 8.13 | | 1 | 11.14 | | 1 | 11.14 | | 1 | 11.14 | |
| RU52 | 3 | 6.37 | | 2 | 8.13 | | 1 | 11.14 | | 1 | 11.14 | |
| RU78 (26+52) | 5 | 4.15 | | 3 | 6.37 | | 2 | 8.13 | | 1 | 11.14 | |
| RU106 | 6 | 3.56 | | 3 | 6.37 | | 2 | 8.13 | | 1 | 11.14 | |
| RU132 (26+106) | 8 | 2.11 | | 4 | 5.12 | | 2 | 8.13 | | 1 | 11.14 | |
| RU242 | na | na | | 7 | 2.69 | | 4 | 5.12 | | 2 | 8.13 | |
| RU484 | na | na | | na | na | | 7 | 2.69 | | 4 | 5.12 | |
| RU996 | na | na | | na | na | | na | na | | 7 | 2.69 | |

Table 3: Expanded Unlicensed Use of the 6 Gigahertz Band

| Device Class | Operating Bands | Maximum EIRP | Maximum EIRP Power Spectral Density |
|---|---|---|---|
| Standard-Power Access Point (AFC Controlled) | U-NII-5 (5.925-6.425 GHz) U-NII-7 (6.525-6.875 GHz) | 36 dBm | 23 dBm/MHz |
| Client Connected to Standard-Power Access Point | | 30 dBm | 17 dBm/MHz |
| Low-Power Access Point (indoor only) | U-NII-5 (5.925-6.425 GHz) U-NII-6 (6.425-6.525 GHz) U-NII-7 (6.525-6.875 GHz) U-NII-8 (6.875-7.125 GHz) | 30 dBm | 5 dBm/MHz |
| Client Connected to Low-Power Access Point | | 24 dBm ← $pwr_{LPI}^{max}$ | -1 dBm/MHz |

$pwr_{dSTF}^{max}$ = {10.76, 13.91, 16.92, 20.00} (dBm) for dSTF over BW20/40/80/160, respectively $Tx_{pwr}^{STA}$ = min { $PL_{DL}$ + $Target_{RSSI}$, $pwr_{dRU}^{max}$, $pwr_{dSTF}^{max}$, $pwr_{LPI}^{max}$ }

$pwr_{dRU}^{max}$ ↓

Max STA Tx Power (dBm) of dRU with power boost gain

| | dRU on BW20 | dRU on BW40 | dRU on BW80 | dRU on BW160 |
|---|---|---|---|---|
| RU26 | 10.21 | 13.15 | 13.15 | 13.15 |
| RU52 | 11.46 | 13.22 | 16.16 | 16.16 |
| RU78 (26+52) | 11.00 | 13.22 | 14.98 | 17.92 |
| RU106 | 11.74 | 14.55 | 16.31 | 19.25 |
| RU132 (26+106) | 11.24 | 14.25 | 17.26 | 20.21 |
| RU242 | NA | 14.46 | 16.89 | 19.90 |
| RU484 | NA | NA | 17.47 | 19.90 |
| RU996 | NA | NA | NA | |
| EHT-STF | 10.76 | 13.91 | 16.92 | 20 |

FIG. 7

Table 3: Expanded Unlicensed Use of the 6 Gigahertz Band

| Device Class | Operating Bands | Maximum EIRP | Maximum EIRP Power Spectral Density |
|---|---|---|---|
| Standard-Power Access Point (AFC Controlled) | U-NII-5 (5.925-6.425 GHz) U-NII-7 (6.525-6.875 GHz) | 36 dBm | 23 dBm/MHz |
| Client Connected to Standard-Power Access Point | | 30 dBm | 17 dBm/MHz |
| Low-Power Access Point (indoor only) | U-NII-5 (5.925-6.425 GHz) U-NII-6 (6.425-6.525 GHz) U-NII-7 (6.525-6.875 GHz) U-NII-8 (6.875-7.125 GHz) | 30 dBm | 5 dBm/MHz |
| Client Connected to Low-Power Access Point | | 24 dBm ← $pwr_{LPI}^{max}$ | -1 dBm/MHz |

800

$$Tx_{pwr}^{STA} = \min \{ PL_{DL} + Target_{RSSI}, \ pwr_{dRU}^{max}, \ pwr_{LPI}^{max} \}$$

$pwr_{dRU}^{max}$ ↓

Max STA Tx Power (dBm) of dRU with power boost gain

| | dRU on BW20 | dRU on BW40 | dRU on BW80 | dRU on BW160 |
|---|---|---|---|---|
| RU26 | 10.21 | 13.15 | 13.15 | 13.15 |
| RU52 | 11.46 | 13.22 | 16.16 | 16.16 |
| RU78 (26+52) | 11.00 | 13.22 | 14.98 | 17.92 |
| RU106 | 11.74 | 14.55 | 16.31 | 19.25 |
| RU132 (26+106) | 11.24 | 14.25 | 17.26 | 20.21 |
| RU242 | NA | 14.46 | 16.89 | 19.90 |
| RU484 | NA | NA | 17.47 | 19.90 |
| RU996 | NA | NA | NA | |
| EHT-STF | 10.76 | 13.91 | 16.92 | 20 |

DISTRIBUTE SUBCARRIERS OF A RESOURCE UNIT (RU) OR MULTI-RESOURCE UNIT (MRU) OVER A PHYSICAL-LAYER PROTOCOL DATA UNIT (PPDU) BANDWIDTH OR A FREQUENCY SUBBLOCK OF A BANDWIDTH TO GENERATE A DISTRIBUTED-TONE RU (dRU) OR DISTRIBUTED MRU (dMRU) ASSOCIATED WITH AN UPLINK (UL) TRIGGER-BASED (TB) PPDU COMPRISING AT LEAST AN EXTREMELY-HIGH-THROUGHPUT (EHT) SHORT TRAINING FIELD (EHT-STF), AN EHT LONG TRAINING FIELD (EHT-LTF), AND A PAYLOAD OF DATA
1010

TRANSMIT THE dRU OR dMRU ASSOCIATED WITH THE UL TB PPDU WITH TRANSMISSION POWER CONTROL (TPC) SUCH THAT SYMBOLS ASSOCIATED WITH THE EHT-STF ARE TRANSMITTED WITH A FIRST POWER AND SYMBOLS ASSOCIATED WITH THE EHT-LTF AND THE PAYLOAD ARE TRANSMITTED WITH A SECOND POWER
1020

FIG. 10

TRANSMISSION POWER CONTROL FOR DISTRIBUTED-TONE RESOURCE UNITS AND MULTI-RESOURCE UNITS IN 6GHZ LOW-POWER INDOOR SYSTEMS

CROSS REFERENCE TO RELATED PATENT APPLICATION

The present disclosure is part of a non-provisional patent application claiming the priority benefit of U.S. Provisional Patent Application No. 63/200,632, filed 19 Mar. 2021, the content of which being incorporated by reference in its entirety.

TECHNICAL FIELD

The present disclosure is generally related to wireless communications and, more particularly, to transmission power control (TPC) for distributed-tone resource units (dRUs) and distributed multi-resource units (dMRUs) in 6 GHz low-power indoor (LPI) systems.

BACKGROUND

Unless otherwise indicated herein, approaches described in this section are not prior art to the claims listed below and are not admitted as prior art by inclusion in this section.

There are strict power spectral density (PSD) requirements for LPI in 6 GHz which tend to result in lower power in transmission and short coverage range. One approach to improving coverage range is to distribute small resource unit (RU) tones ("regular RU" or "logical RU") over a wider bandwidth or a large frequency subblock, thereby resulting in interleaved, interlaced or distributed-tone RUs (dRU) and aggregations of multiple dRUs, or dMRUs, to achieve higher transmission power. Unlike regular RUs (rRU) in which subcarriers are basically continuous or adjacent to one another, the subcarriers in dRUs or dMRUs are spread over a wider bandwidth and hence the tones are separated apart with different distances therebetween. Due to the number of available tones being different in extremely-high-throughput (EHT) short training field (STF) symbol as well as data and EHT long training field (EHT-LTF) symbols, the allowed maximum transmission power for EHT-STF and data/EHT-LTF symbols could be different in order to meet the LPI PSD requirement (e.g., −1 dBm/MHz for non-access point (non-AP) stations (STAs)). For some dRU/dMRU transmission scenarios, the maximum transmission power of uplink (UL) trigger-based (TB) physical-layer protocol data unit (PPDU) with dRU/dMRU could be limited by the EHT-STF transmission power. Therefore, there is a need for a solution for TPC for dRUs and MRUs in 6 GHz LPI systems.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to TPC for dRUs and dMRUs in 6 GHz LPI systems. It is believed that implementations of the proposed schemes may address or otherwise alleviate aforementioned issues.

In one aspect, a method may involve distributing subcarriers of a RU over a PPDU bandwidth or a frequency subblock of a bandwidth to generate a dRU associated with an UL TB PPDU comprising at least an EHT-STF, an EHT-LTF, and a payload of data. The method may also involve transmitting the dRU or dMRU associated with the UL TB PPDU with transmission power control such that symbols associated with the EHT-STF are transmitted with a first power and symbols associated with the EHT-LTF and the payload are transmitted with a second power.

In another aspect, an apparatus may include a transceiver and a processor coupled to the transceiver. The transceiver may be configured to transmit and receive wirelessly. The processor may be configured to distribute subcarriers of a RU over a PPDU bandwidth or a frequency subblock of a bandwidth to generate a dRU associated with an UL TB PPDU comprising at least an EHT-STF, an EHT-LTF, and a payload of data. The processor may be also configured to transmit the dRU or dMRU associated with the UL TB PPDU with transmission power control such that symbols associated with the EHT-STF are transmitted with a first power and symbols associated with the EHT-LTF and the payload are transmitted with a second power.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of an example scenario in accordance with an implementation of the present disclosure.

FIG. 7 is a diagram of an example scenario in accordance with an implementation of the present disclosure.

FIG. 8 is a diagram of an example scenario in accordance with an implementation of the present disclosure.

FIG. 10 is a flowchart of an example process in accordance with an implementation of the present disclosure.

DETAILED DESCRIPTION OF PREFERRED EMBODIMENTS

Figure 1:
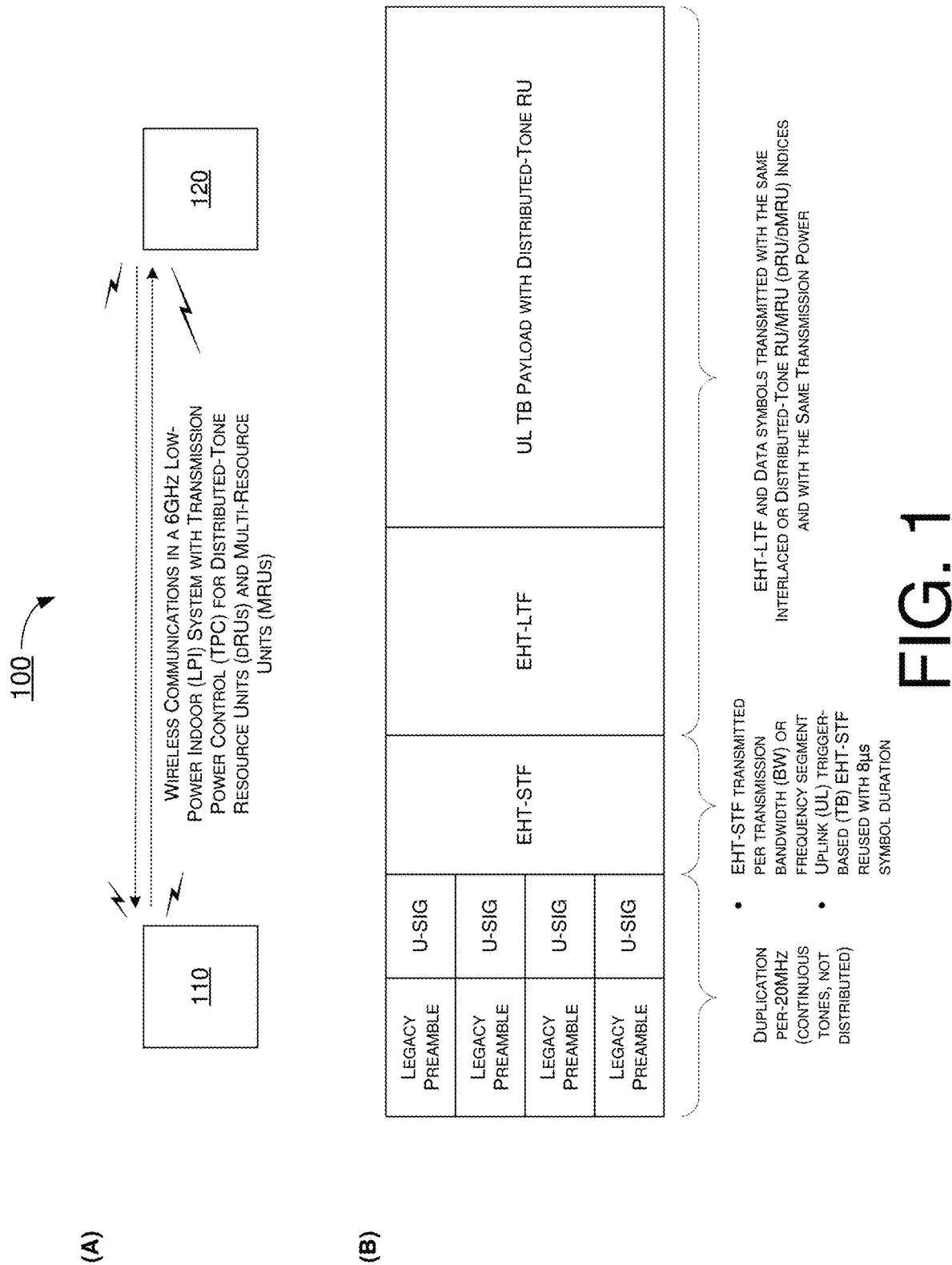
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to TPC for dRUs and dMRUs in 6 GHz LPI systems. According to the present disclosure, a number of possible solutions may be implemented separately or jointly. That is, although these possible solutions may be described below separately, two or more of these possible solutions may be implemented in one combination or another.

It is noteworthy that, in the present disclosure, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular MRU may be interchangeably denoted as MRU78 (or rMRU78), an aggregate (26+106)-tone regular MRU may be interchangeably denoted as MRU132 (or rMRU132), and so on. Furthermore, in the present disclosure, a 26-tone distributed-tone RU may be interchangeably denoted as dRU26, a 52-tone distributed-tone RU may be interchangeably denoted as dRU52, a 106-tone distributed-tone RU may be interchangeably denoted as dRU106, a 242-tone distributed-tone RU may be interchangeably denoted as dRU242, and so on. Additionally, an aggregate (26+52)-tone distributed-tone MRU may be interchangeably denoted as dMRU78, an aggregate (26+106)-tone distributed-tone MRU may be interchangeably denoted as dMRU132, and so on.

Since the above examples are merely illustrative examples and not an exhaustive listing of all possibilities, the same applies to regular RUs, distributed-tone RUs, MRUs, and distributed-tone MRUs of different sizes (or different number of tones). It is also noteworthy that, in the present disclosure, a bandwidth of 20 MHz may be interchangeably denoted as BW20, a bandwidth of 40 MHz may be interchangeably denoted as BW40, a bandwidth of 80 MHz may be interchangeably denoted as BW80, a bandwidth of 160 MHz may be interchangeably denoted as BW160, a bandwidth of 240 MHz may be interchangeably denoted as BW240, and a bandwidth of 320 MHz may be interchangeably denoted as BW320. It is further noteworthy that, in the present disclosure, a 26-tone interleaved-tone (or interlaced-tone) RU may be interchangeably denoted as iRU26, a 52-tone interleaved-tone (or interlaced-tone) RU may be interchangeably denoted as iRU52, a 106-tone interleaved-tone (or interlaced-tone) RU may be interchangeably denoted as iRU106, a 242-tone interleaved-tone (or interlaced-tone) RU may be interchangeably denoted as iRU242, and a 484-tone interleaved-tone (or interlaced-tone) RU may be interchangeably denoted as iRU484.

FIG. 1 illustrates an example network environment 100 in which various solutions and schemes in accordance with the present disclosure may be implemented. FIG. 2~FIG. 10 illustrate examples of implementation of various proposed schemes in network environment 100 in accordance with the present disclosure. The following description of various proposed schemes is provided with reference to FIG. 1~FIG. 10.

Referring to part (A) of FIG. 1, network environment 100 may involve a communication entity 110 and a communication entity 120 communicating wirelessly (e.g., in a WLAN in accordance with one or more IEEE 802.11 standards). For instance, communication entity 110 may be a first station (STA) and communication entity 120 may be a second STA, with each of the first STA and second STA functioning as either an access point (AP) STA or a non-AP STA. Under various proposed schemes in accordance with the present disclosure, communication entity 110 and communication entity 120 may be configured to communicate wirelessly with TPC for dRUs and dMRUs in 6 GHz LPI systems, as described herein.

Referring to part (B) of FIG. 1, an UL TB PPDU transmitted by UE 110 under various proposed schemes in accordance with the present disclosure may include legacy preamble(s), universal signal (U-SIG) field(s), an EHT-STF, an EHT long training field (EHT-LTF), and a payload (e.g., data). The legacy preamble(s) and U-SIG field(s) may be transmitted per 20 MHz (e.g., continuous/adjacent tones that are not distributed or otherwise interleaved or interlaced) and may be duplicated for each 20 MHz segment or frequency subblock. On the other hand, each of the EHT-LTF and payload may be transmitted with the same interlaced or distributed-tone RU/MRU (dRU/dMRU) indices and with the same transmission power. More specifically, under various proposed schemes described below, the EHT-STF may be transmitted per distribution bandwidth (BW) or frequency segment with UL TB EHT-STF reused with an 8 µs symbol duration and same EHT-STF frequency domain sequence for rRU.

Generally, EHT-STF serves the purposes of power measurement for automatic gain control (AGC) and auto-detection of EHT-STF based on its periodic repetitions. For an UL TB PPDU with regular RU(s), the EHT-STF is typically transmitted with the same subcarrier indices (herein interchangeably referred to as "tone index or tone indices") as the assigned RU. To achieve better power measurement and perform for both large RUs (e.g., wider bandwidth) and small RUs (e.g., narrow bandwidth), 8 µs EHT-STF (e.g., one STF tone in every eight tones) is used for UL TB PPDU transmissions with a 1.6 µs periodicity (hence repetition of five times in 8 µs). The 8 µs EHT-STF has 8× downsampling in frequency domain. Unlike the regular RUs (rRUs), subcarriers in dRUs are not continuous or adjacent with one another, and thus EHT-STF cannot be transmitted directly with the same subcarrier indices as that of the dRU. Instead, EHT-STF transmission is defined with the specific segments or subblocks or portions or entire BW in frequency domain according to various proposed schemes herein.

FIG. 2 illustrates an example scenario 200 of maximum transmission power used by a non-AP STA under a proposed scheme in accordance with the present disclosure. Under the proposed scheme, the maximum transmission power used by a non-AP STA (e.g., communication entity 110 or communication entity 120) for dRUs/dMRUs in a 6 GHz LPI system may be derived from the maximum transmission power for regular RUs/MRUs in a 6 GHz LPI system and corresponding distribution power gains.

Figure 3:
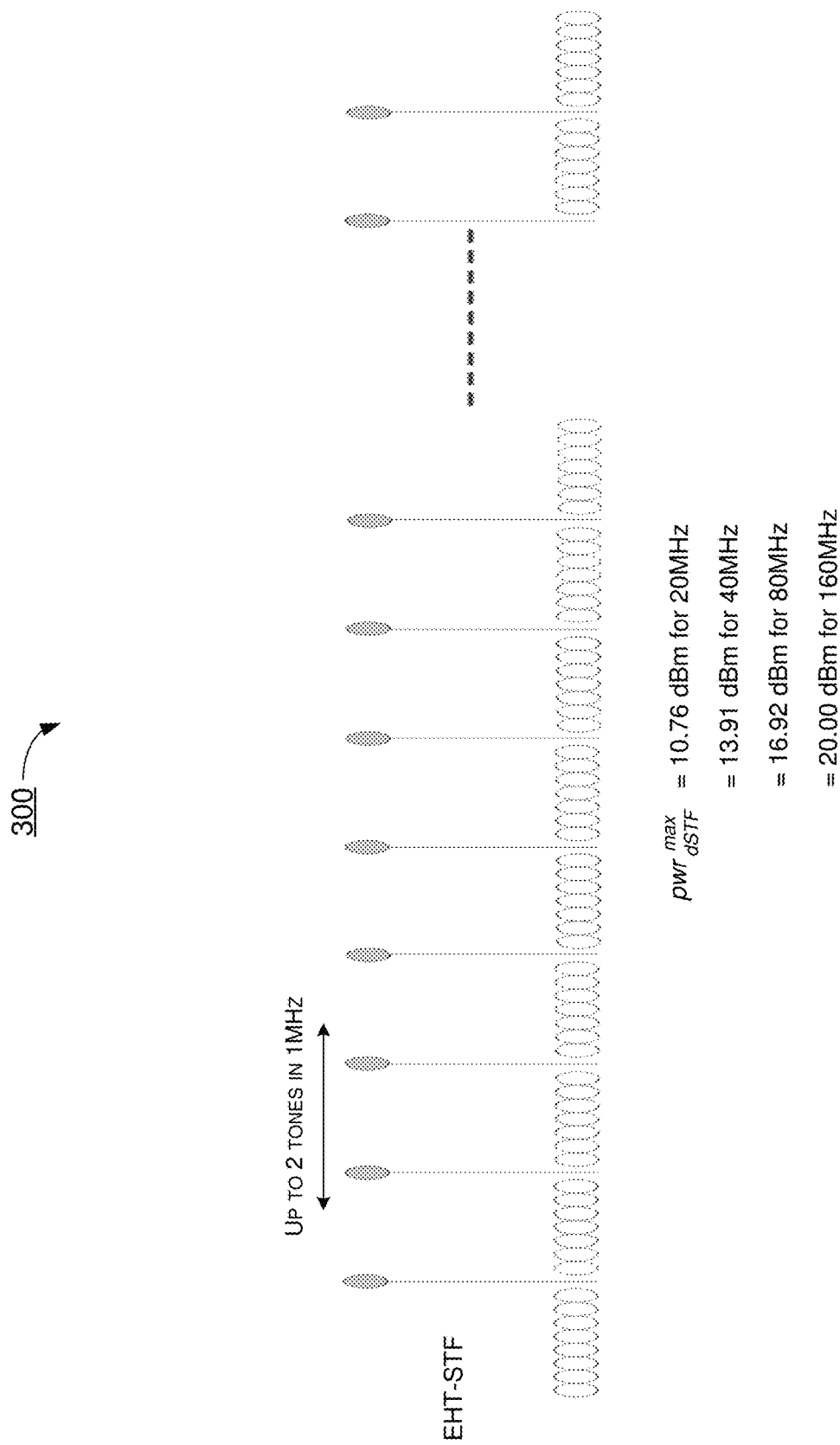
FIG. 3 is a diagram of an example scenario in accordance with an implementation of the present disclosure.

FIG. 3 illustrates an example scenario 300 of EHT-STF power limitation under a proposed scheme in accordance with the present disclosure. Under the proposed scheme, an UL TB PPDU with 8 µs EHT-STF has 8× down-sampling in frequency domain with a 1.6 µs periodicity and five periods. Specifically, for BW20, there may be 30 tones with up to two tones in 1 MHz, and the maximum transmission power for EHT-STF ($pwr_{dSTF}^{max}$) may be $10*\log_{10}(30/2)-1=10.76$ dBm. For BW40, there may be 62 tones with up to two tones in 1 MHz, and the maximum transmission power may be $10*\log_{10}(62/2)-1=13.91$ dBm. For BW80, there may be 124 tones with up to two tones in 1 MHz, and the maximum transmission power may be $10*\log_{10}(124/2)-1=16.92$ dBm. For BW160, there may be 252 tones with up to two tones in 1 MHz, and the maximum transmission power may be $10*\log_{10}(252/2)-1=20.00$ dBm.

Figure 4:
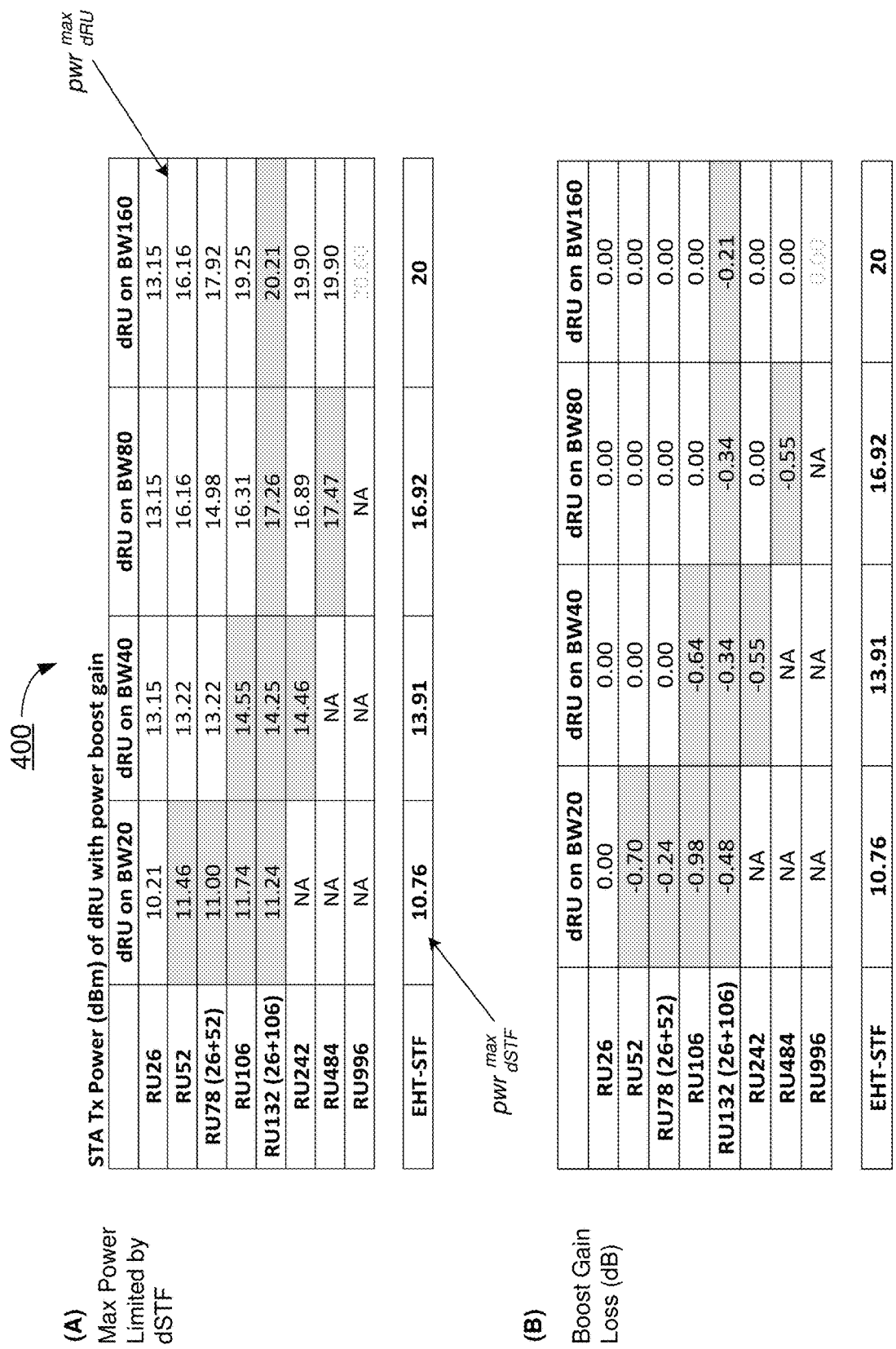
FIG. 4 is a diagram of an example scenario in accordance with an implementation of the present disclosure.

FIG. 4 illustrates an example scenario 400 of distributed STF (dSTF) PSD limitation under a proposed scheme in accordance with the present disclosure. Part (A) of FIG. 4 shows an example of the maximum power of a STA limited by dSTF. It is noteworthy that the term "dSTF" herein refers to an EHT-STF transmission with interleaved, interlaced or otherwise distributed-tone RU/MRU (dRU/dMRU) transmission is enabled. In the table shown in part (A) of FIG. 4, each highlighted box indicates that the corresponding maximum transmission power of data/EHT-LTF symbol is limited by the maximum transmission power of EHT-STF. Part (B) of FIG. 4 shows an example of the power boost gain loss in dB of EHT-LTF and data symbol portions (due to limitation by the maximum EHT-STF power).

Figure 5:
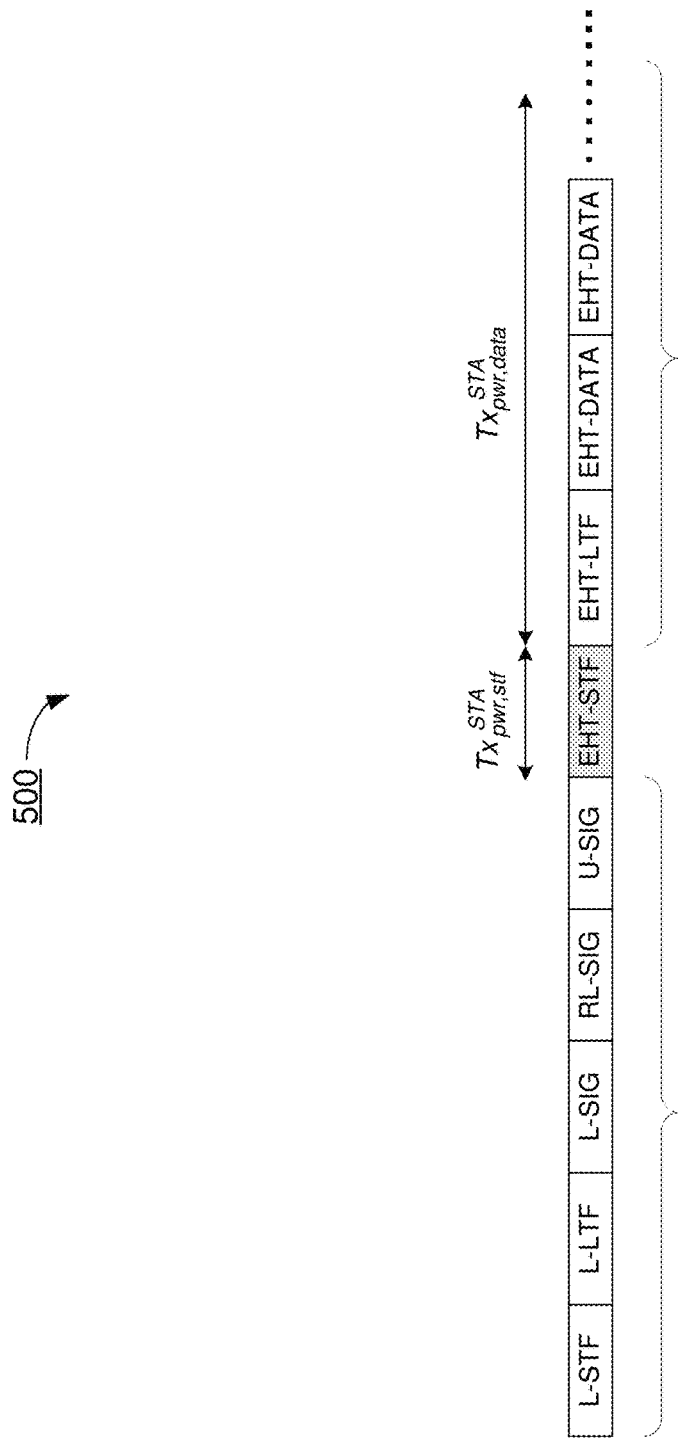
FIG. 5 is a diagram of an example scenario in accordance with an implementation of the present disclosure.

FIG. 5 illustrates an example scenario 500 of general considerations for dRU/dMRU transmission power control under various proposed schemes in accordance with the present disclosure. In the present disclosure, the term "$pwr_{dRU}^{max}$" denotes the maximum allowed transmission power for EHT-LTF/data symbols as defined in FIG. 2. The term "$pwr_{dSTF}^{max}$" denotes the maximum allowed transmission power for EHT-STF symbols as defined in FIG. 3. The term "$Tx_{pwr,data}^{STA}$" denotes the actual transmission power for EHT-LTF/data symbols. The term "$Tx_{pwr,stf}^{STA}$" denotes the actual transmission power for EHT-STF symbols. Referring to the left side of FIG. 5, the fields of legacy short training field (L-STF), legacy long training field (L-LTF), legacy signal (L-SIG), repeated legacy signal (RL-SIG) and universal signal (U-SIG) may be transmitted with the same power over the legacy preamble symbols and without tone distribution. The transmission power may be either the same as the maximum allowed L-LTF/SIG power or the same as the maximum allowed L-STF power. Referring to the right side of FIG. 5, the fields of EHT-LTF and one or more EHT-DATA may be transmitted with the same power for EHT-LTF and data symbols. The transmission power for EHT-LTF/data symbols may be the same as or different from the transmission power for EHT-STF symbols, as described below.

Figure 6:
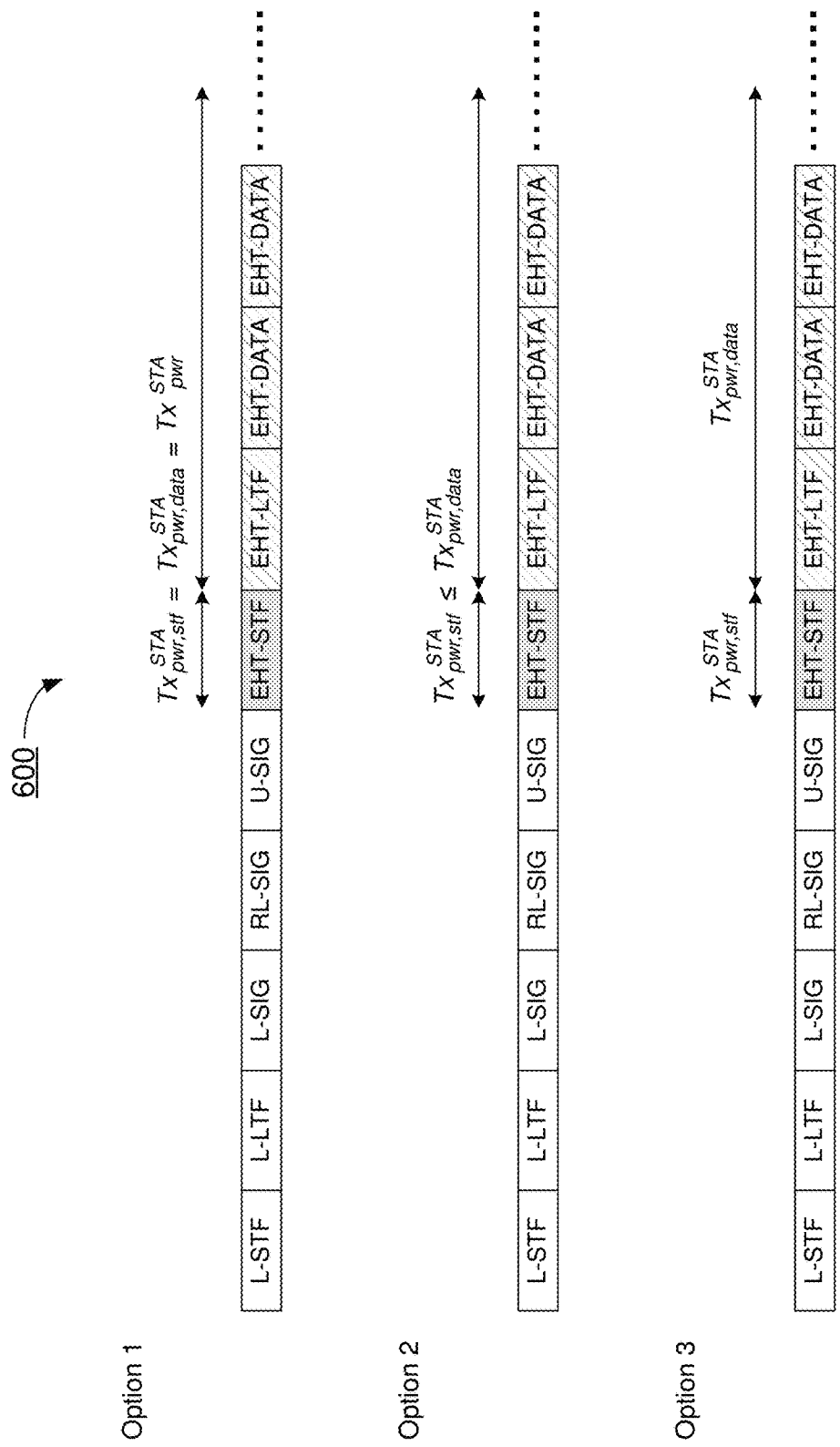
FIG. 6 is a diagram of an example scenario in accordance with an implementation of the present disclosure.

FIG. 6 illustrates an example scenario 600 of general considerations for dRU/dMRU transmission power control under various proposed schemes in accordance with the present disclosure. Scenario 600 shows three different options for the dRU/dMRU transmission power control (TPC). In particular, a first option (Option 1), a second option (Option 2) and a third option (Option 3) may be considered for dRU/dMRU TPC under various proposed schemes in accordance with the present disclosure, as described below.

FIG. 7 illustrates an example scenario 700 of dRU/dMRU TPC under a first approach of Option 1. Under the first approach of Option 1, EHT-STF symbols and EHT-LTF/data symbols may be transmitted with the same power, and this may be expressed as: $Tx_{pwr,stf}^{STA}=Tx_{pwr,data}^{STA}=Tx_{pwr}^{STA}$. The transmission power may be limited by both $pwr_{dRU}^{max}$ and $pwr_{dSTF}^{max}$. Here, $pwr_{dSTF}^{max}=\{10.76, 13.91, 16.92, 20.00\}$ in dBm for dSTF over BW20, BW40, BW80 and BW160, respectively. Accordingly, the actual transmission power of a STA ($Tx_{pwr}^{STA}$) may be the minimum among certain parameters, as follows: $Tx_{pwr}^{STA}=\min\{PL_{DL}+Target_{RSSI}, pwr_{dRU}^{max}, pwr_{dSTF}^{max}, pwr_{LPI}^{max}\}$. In the present disclosure, the term "$PL_{DL}$" denotes downlink (DL) path loss (PL), the term "$Target_{RSSI}$" denotes a target received signal strength indicator (RSSI), the term "$pwr_{LPI}^{max}$" denotes the maximum allowed transmission power in the LPI system.

FIG. 8 illustrates an example scenario 800 of dRU/dMRU TPC under a second approach of Option 1. Under the second approach of Option 1, EHT-STF symbols and EHT-LTF/data symbols may be transmitted with the same power, and this may be expressed as follows: $Tx_{pwr,stf}^{STA}=Tx_{pwr,data}^{STA}=Tx_{pwr}^{STA}$. The transmission power may be limited by $pwr_{dRU}^{max}$. Accordingly, the actual transmission power of a STA for EHT-STF symbols ($Tx_{pwr,stf}^{STA}$) and EHT-LTF/data symbols ($Tx_{pwr,data}^{STA}$) may be the minimum among certain parameters, as follows: $Tx_{pwr,stf}^{STA}=Tx_{pwr,data}^{STA}=\min\{PL_{DL}+Target_{RSSI}, pwr_{dRU}^{max}, pwr_{LPI}^{max}\}$.

Under Option 2 of the proposed scheme, EHT-STF symbols and EHT-LTF/data symbols may be transmitted with the same power or different powers (e.g., $Tx_{pwr,stf}^{STA} \leq Tx_{pwr,data}^{STA}$). Additionally, the transmission power of EHT-STF symbols may be limited by $pwr_{dSTF}^{max}$. Moreover, the transmission power of EHT-LTF/data symbols may be limited by $pwr_{dRU}^{max}$. Accordingly, the actual transmission power of EHT-LTF/data symbols may be expressed as follows: $Tx_{pwr,data}^{STA}=\min\{PL_{DL}+Target_{RSSI}, pwr_{dRU}^{max}, pwr_{LPI}^{max}\}$. Similarly, the actual transmission power of EHT-STF symbols may be expressed as follows: $Tx_{pwr,stf}^{STA}=\min\{PL_{DL}+Target_{RSSI}, pwr_{dSTF}^{max}, pwr_{LPI}^{max}\}$.

Under Option 3 of the proposed scheme, EHT-STF symbols and EHT-LTF/data symbols may be transmitted with different powers in an event of $pwr_{dSTF}^{max}<pwr_{dRU}^{max}$. Additionally, EHT-STF symbols may be transmitted with the maximum allowed power and may be limited by $pwr_{dSTF}^{max}$. Moreover, the transmission power of EHT-LTF/data symbols may be limited by $pwr_{LSFT}^{max}+\Delta F(mcs,nss)$, which is the maximum allowed EHT-STF transmission power adjusted by a delta. Accordingly, in an event of, $pwr_{dSTF}^{max}<pwr_{dRU}^{max}$, the actual transmission power of EHT-STF symbols may be expressed as follows: $Tx_{pwr,stf}^{STA}=\min\{PL_{DL}+Target_{RSSI}, pwr_{dSTF}^{max}, pwr_{LPI}^{max}\}$. Moreover, the actual transmission power of EHT-LTF/data symbols may be expressed as follows:

$$Tx_{pwr,data}^{STA} = \min\{PL_{DL} + Target_{RSSI}, pwr_{dRU}^{max}, pwr_{dSTF}^{max} + \Delta F(mcs, nss), pwr_{LPI}^{max}\}.$$ Here, the parameter $\Delta F$ may be dependent upon the modulation coding scheme (MCS) and/or the number of spatial streams (Nss), and the range of adjustment of $\Delta F$ (in dB) may vary. For instance, $\Delta F$ may be equal to zero for most scenarios when the transmission power is not over the limit of the maximum EHT-STF power. Also, under Option 3 of the proposed scheme, in an event of $pwr_{dSTF}^{max} \geq pwr_{dRU}^{max}$, the actual transmission power of EHT-STF symbols and the actual transmission power of EHT-LTF/data symbols may be the same and may be expressed as follows: $Tx_{pwr,stf}^{STA} = Tx_{pwr,data}^{STA} = \min\{PL_{DL} + Target_{RSSI}, pwr_{dRU}^{max}, pwr_{LPI}^{max}\}$.

Illustrative Implementations

Figure 9:
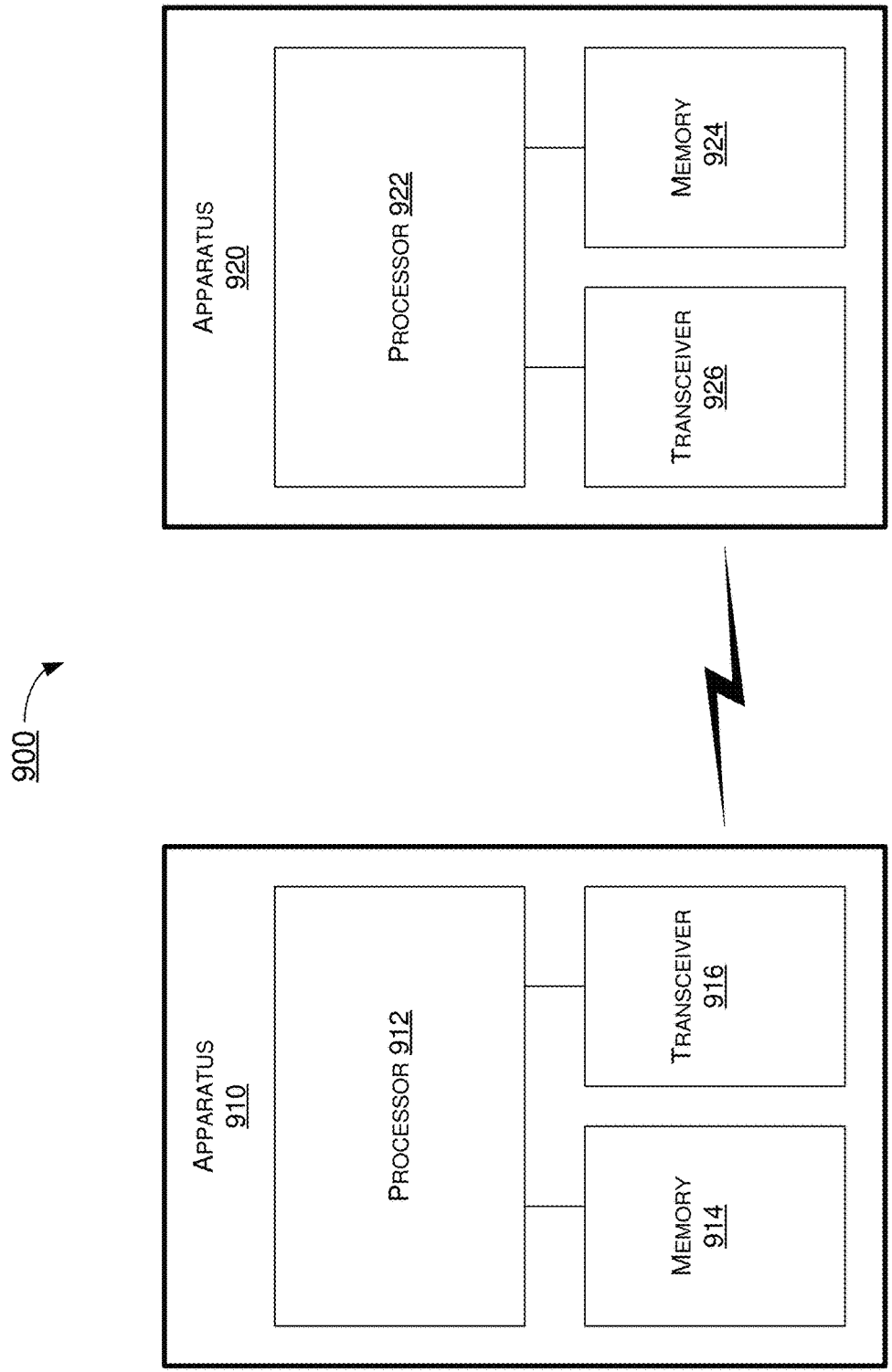
FIG. 9 is a block diagram of an example communication system in accordance with an implementation of the present disclosure.

FIG. 9 illustrates an example communication system 900 having at least an example apparatus 910 and an example apparatus 920 in accordance with an implementation of the present disclosure. Each of apparatus 910 and apparatus 920 may perform various functions to implement schemes, techniques, processes and methods described herein pertaining to TPC for dRUs and MRUs in 6 GHz LPI systems, including the various schemes described above with respect to various proposed designs, concepts, schemes, systems and methods described above as well as processes described below. For instance, apparatus 910 may be an example implementation of communication entity 110, and apparatus 920 may be an example implementation of communication entity 120.

Each of apparatus 910 and apparatus 920 may be a part of an electronic apparatus, which may be a STA or an AP, such as a portable or mobile apparatus, a wearable apparatus, a wireless communication apparatus or a computing apparatus. For instance, each of apparatus 910 and apparatus 920 may be implemented in a smartphone, a smart watch, a personal digital assistant, a digital camera, or a computing equipment such as a tablet computer, a laptop computer or a notebook computer. Each of apparatus 910 and apparatus 920 may also be a part of a machine type apparatus, which may be an IoT apparatus such as an immobile or a stationary apparatus, a home apparatus, a wire communication apparatus or a computing apparatus. For instance, each of apparatus 910 and apparatus 920 may be implemented in a smart thermostat, a smart fridge, a smart door lock, a wireless speaker or a home control center. When implemented in or as a network apparatus, apparatus 910 and/or apparatus 920 may be implemented in a network node, such as an AP in a WLAN.

In some implementations, each of apparatus 910 and apparatus 920 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 910 and apparatus 920 may be implemented in or as a STA or an AP. Each of apparatus 910 and apparatus 920 may include at least some of those components shown in FIG. 9 such as a processor 912 and a processor 922, respectively, for example. Each of apparatus 910 and apparatus 920 may further include one or more other components not pertinent to the proposed scheme of the present disclosure (e.g., internal power supply, display device and/or user interface device), and, thus, such component(s) of apparatus 910 and apparatus 920 are neither shown in FIG. 9 nor described below in the interest of simplicity and brevity.

In one aspect, each of processor 912 and processor 922 may be implemented in the form of one or more single-core processors, one or more multi-core processors, one or more RISC processors or one or more CISC processors. That is, even though a singular term "a processor" is used herein to refer to processor 912 and processor 922, each of processor 912 and processor 922 may include multiple processors in some implementations and a single processor in other implementations in accordance with the present disclosure. In another aspect, each of processor 912 and processor 922 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 912 and processor 922 is a special-purpose machine specifically designed, arranged and configured to perform specific tasks including those pertaining to TPC for dRUs and MRUs in 6 GHz LPI systems in accordance with various implementations of the present disclosure. For instance, each of processor 912 and processor 922 may be configured with hardware components, or circuitry, implementing one, some or all of the examples described and illustrated herein.

In some implementations, apparatus 910 may also include a transceiver 916 coupled to processor 912. Transceiver 916 may be capable of wirelessly transmitting and receiving data. In some implementations, apparatus 920 may also include a transceiver 926 coupled to processor 922. Transceiver 926 may include a transceiver capable of wirelessly transmitting and receiving data.

In some implementations, apparatus 910 may further include a memory 914 coupled to processor 912 and capable of being accessed by processor 912 and storing data therein. In some implementations, apparatus 920 may further include a memory 924 coupled to processor 922 and capable of being accessed by processor 922 and storing data therein. Each of memory 914 and memory 924 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 914 and memory 924 may include a type of read-only memory (ROM) such as mask ROM, programmable ROM (PROM), erasable programmable ROM (EPROM) and/or electrically erasable programmable ROM (EEPROM). Alternatively, or additionally, each of memory 914 and memory 924 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 910 and apparatus 920 may be a communication entity capable of communicating with each other using various proposed schemes in accordance with the present disclosure. For illustrative purposes and without limitation, a description of capabilities of apparatus 910, as communication entity 110, and apparatus 920, as communication entity 120, is provided below. It is noteworthy that, although the example implementations described below are provided in the context of WLAN, the same may be implemented in other types of networks. Thus, although the following description of example implementations pertains to a scenario in which apparatus 910 functions as a transmitting device and apparatus 920 functions as a receiving device, the same is also applicable to another scenario in which apparatus 910 functions as a receiving device and apparatus 920 functions as a transmitting device.

Under a proposed scheme in accordance with the present disclosure with respect to TPC for dRUs and dMRUs in 6 GHz LPI systems, processor 912 of apparatus 910 may distribute subcarriers of a RU over a PPDU bandwidth or a frequency subblock of a bandwidth to generate a dRU associated with an UL TB PPDU comprising at least an EHT-STF, an EHT-LTF, and a payload of data. Moreover, processor 912 may transmit, via transceiver 916, the dRU associated with the UL TB PPDU with TPC such that symbols associated with the EHT-STF are transmitted with a first power and symbols associated with the EHT-LTF and the payload are transmitted with a second power.

In some implementations, the first power and the second power may be equal. In some implementations, the first power (or the maximum allowable transmission power associated with the EHT-STF symbols) may be limited to 10.76 dBm, 13.91 dBm, 16.92 dBm or 20.00 dBm over a 20 MHz bandwidth, a 40 MHz bandwidth, an 80 MHz bandwidth or a 160 MHz bandwidth, respectively. In some implementations, an actual transmission power of the dRU or dMRU associated with the UL TB PPDU may be limited to a minimum among the following: (a) a DL PL plus a target RSSI, (b) a maximum allowed transmission power for the symbols associated with the EHT-LTF and the payload, (c) a maximum allowed transmission power for the symbols associated with the EHT-STF, and (d) a maximum allowed transmission power in a 6 GHz LPI system. Alternatively, the actual transmission power of the dRU or dMRU associated with the UL TB PPDU may be limited to a minimum among the following: (a) a DL PL plus a target RSSI, (b) a maximum allowed transmission power for the symbols associated with the EHT-LTF and the payload, and (c) a maximum allowed transmission power in a 6 GHz LPI system.

In some implementations, the first power may be less than or equal to the second power. In some implementations, an actual transmission power of the dRU or dMRU associated with the UL TB PPDU may be limited to a minimum among the following: (a) a DL PL plus a target RSSI, (b) a maximum allowed transmission power for the symbols associated with the EHT-LTF and the payload, and (c) a maximum allowed transmission power in a 6 GHz LPI system. Alternatively, the actual transmission power of the dRU or dMRU associated with the UL TB PPDU may be limited to a minimum among the following: (a) a DL PL plus a target RSSI, (b) a maximum allowed transmission power for the symbols associated with the EHT-STF, and (c) a maximum allowed transmission power in a 6 GHz LPI system.

In some implementations, the first power and the second power may be the same or different. In some implementations, in an event that the first power is less than the second power, an actual transmission power of the dRU or dMRU associated with the UL TB PPDU may be limited to a minimum among the following: (a) a DL PL plus a target RSSI, (b) a maximum allowed transmission power for the symbols associated with the EHT-STF, and (c) a maximum allowed transmission power in a 6 GHz LPI system. Alternatively, in an event that the first power is less than the second power, the actual transmission power of the dRU or dMRU associated with the UL TB PPDU may be limited to a minimum among the following: (a) a DL PL plus a target RSSI, (b) a maximum allowed transmission power for the symbols associated with the EHT-LTF and the payload, (c) a maximum allowed transmission power for the symbols associated with the EHT-STF plus an adjustment which is dependent upon MCS and an Nss, and (d) a maximum allowed transmission power in a 6 GHz LPI system. Still alternatively, in an event that the first power is greater than or equal to the second power, an actual transmission power of the dRU or dMRU associated with the UL TB PPDU may be limited to a minimum among the following: (a) a DL PL plus a target RSSI, (b) a maximum allowed transmission power for the symbols associated with the EHT-LTF and the payload, and (c) a maximum allowed transmission power in a 6 GHz LPI system.

Illustrative Processes

FIG. 10 illustrates an example process 1000 in accordance with an implementation of the present disclosure. Process 1000 may represent an aspect of implementing various proposed designs, concepts, schemes, systems and methods described above. More specifically, process 1000 may represent an aspect of the proposed concepts and schemes pertaining to TPC for dRUs and MRUs in 6 GHz LPI systems in accordance with the present disclosure. Process 1000 may include one or more operations, actions, or functions as illustrated by one or more of blocks 1010 and 1020. Although illustrated as discrete blocks, various blocks of process 1000 may be divided into additional blocks, combined into fewer blocks, or eliminated, depending on the desired implementation. Moreover, the blocks/sub-blocks of process 1000 may be executed in the order shown in FIG. 10 or, alternatively in a different order. Furthermore, one or more of the blocks/sub-blocks of process 1000 may be executed repeatedly or iteratively. Process 1000 may be implemented by or in apparatus 910 and apparatus 920 as well as any variations thereof. Solely for illustrative purposes and without limiting the scope, process 1000 is described below in the context of apparatus 910 as communication entity 110 (e.g., a transmitting device whether a STA or an AP) and apparatus 920 as communication entity 120 (e.g., a receiving device whether a STA or an AP) of a wireless network such as a WLAN in accordance with one or more of IEEE 802.11 standards. Process 1000 may begin at block 1010.

At 1010, process 1000 may involve processor 912 of apparatus 910 distributing subcarriers of a RU over a PPDU bandwidth or a frequency subblock of a bandwidth to generate a dRU associated with an UL TB PPDU comprising at least an EHT-STF, an EHT-LTF, and a payload of data. Process 1000 may proceed from 1010 to 1020.

At 1020, process 1000 may involve processor 912 transmitting, via transceiver 916, the dRU or dMRU associated with the UL TB PPDU with TPC such that symbols associated with the EHT-STF are transmitted with a first power and symbols associated with the EHT-LTF and the payload are transmitted with a second power.

In some implementations, the first power and the second power may be equal. In some implementations, the first power (or the maximum allowable transmission power associated with the EHT-STF symbols) may be limited to 10.76 dBm, 13.91 dBm, 16.92 dBm or 20.00 dBm over a 20 MHz bandwidth, a 40 MHz bandwidth, an 80 MHz bandwidth or a 160 MHz bandwidth, respectively. In some implementations, an actual transmission power of the dRU or dMRU associated with the UL TB PPDU may be limited to a minimum among the following: (a) a DL PL plus a target RSSI, (b) a maximum allowed transmission power for the symbols associated with the EHT-LTF and the payload, (c a maximum allowed transmission power for the symbols associated with the EHT-STF, and (d) a maximum allowed transmission power in a 6 GHz LPI system. Alternatively, the actual transmission power of the dRU or dMRU associated with the UL TB PPDU may be limited to a minimum among the following: (a) a DL PL plus a target RSSI, (b) a maximum allowed transmission power for the symbols associated with the EHT-LTF and the payload, and (c) a maximum allowed transmission power in a 6 GHz LPI system.

In some implementations, the first power may be less than or equal to the second power. In some implementations, an actual transmission power of the dRU or dMRU associated with the UL TB PPDU may be limited to a minimum among the following: (a) a DL PL plus a target RSSI, (b) a maximum allowed transmission power for the symbols associated with the EHT-LTF and the payload, and (c) a maximum allowed transmission power in a 6 GHz LPI system. Alternatively, the actual transmission power of the dRU or dMRU associated with the UL TB PPDU may be limited to a minimum among the following: (a) a DL PL plus a target RSSI, (b) a maximum allowed transmission power for the symbols associated with the EHT-STF, and (c) a maximum allowed transmission power in a 6 GHz LPI system.

In some implementations, the first power and the second power may be the same or different. In some implementations, in an event that the first power is less than the second power, an actual transmission power of the dRU or dMRU associated with the UL TB PPDU may be limited to a minimum among the following: (a) a DL PL plus a target RSSI, (b) a maximum allowed transmission power for the symbols associated with the EHT-STF, and (c) a maximum allowed transmission power in a 6 GHz LPI system. Alternatively, in an event that the first power is less than the second power, the actual transmission power of the dRU or dMRU associated with the UL TB PPDU may be limited to a minimum among the following: (a) a DL PL plus a target RSSI, (b) a maximum allowed transmission power for the symbols associated with the EHT-LTF and the payload, (c) a maximum allowed transmission power for the symbols associated with the EHT-STF plus an adjustment which is dependent upon MCS and an Nss, and (d) a maximum allowed transmission power in a 6 GHz LPI system. Still alternatively, in an event that the first power is greater than or equal to the second power, an actual transmission power of the dRU or dMRU associated with the UL TB PPDU may be limited to a minimum among the following: (a) a DL PL plus a target RSSI, (b) a maximum allowed transmission power for the symbols associated with the EHT-LTF and the payload, and (c) a maximum allowed transmission power in a 6 GHz LPI system.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   distributing subcarriers of a resource unit (RU) or multi-resource unit (MRU) over a physical-layer protocol data unit (PPDU) bandwidth or a frequency subblock of a bandwidth to generate a distributed-tone RU (dRU) or distributed MRU (dMRU) associated with an uplink (UL) trigger-based (TB) PPDU comprising at least an extremely-high-throughput (EHT) short training field (EHT-STF), an EHT long training field (EHT-LTF), and a payload of data; and
   transmitting the dRU or dMRU associated with the UL TB PPDU with transmission power control (TPC) such that symbols associated with the EHT-STF are transmitted with a first power and symbols associated with the EHT-LTF and the payload are transmitted with a second power,
   wherein an actual transmission power of the dRU or dMRU associated with the UL TB PPDU is limited to a minimum among:
      a downlink (DL) path loss (PL) plus a target received signal strength indicator (RSSI),
      a maximum allowed transmission power for the symbols associated with the EHT-LTF and the payload, and
      a maximum allowed transmission power in a 6 GHz low-power indoor (LPI) system.

2. The method of claim 1, wherein the first power and the second power are equal.

3. The method of claim 2, wherein the first power is limited to 10.76 dBm, 13.91 dBm, 16.92 dBm or 20.00 dBm over a 20 MHz bandwidth, a 40 MHz bandwidth, an 80 MHz bandwidth or a 160 MHz bandwidth, respectively.

4. The method of claim 2, wherein the actual transmission power of the dRU or dMRU associated with the UL TB PPDU is limited to a minimum among:
   the DL PL plus the target RSSI,
   the maximum allowed transmission power for the symbols associated with the EHT-LTF and the payload,
   a maximum allowed transmission power for the symbols associated with the EHT-STF, and
   the maximum allowed transmission power in the 6 GHZ LPI system.

5. The method of claim 1, wherein the first power is less than or equal to the second power.

6. The method of claim 5, wherein the actual transmission power of the dRU or dMRU associated with the UL TB PPDU is limited to a minimum among:
   the DL PL plus the target RSSI,
   a maximum allowed transmission power for the symbols associated with the EHT-STF, and
   the maximum allowed transmission power in the 6 GHz LPI system.

7. The method of claim 1, wherein the first power and the second power are same or different.

8. The method of claim 7, wherein, in an event that the first power is less than the second power, the actual transmission power of the dRU or dMRU associated with the UL TB PPDU is limited to a minimum among:
   the DL PL plus the target RSSI,
   a maximum allowed transmission power for the symbols associated with the EHT-STF, and
   the maximum allowed transmission power in the 6 GHz LPI low-power indoor (LPI)-system.

9. The method of claim 7, wherein, in an event that the first power is less than the second power, the actual transmission power of the dRU or dMRU associated with the UL TB PPDU is limited to a minimum among:
   the DL PL plus the target RSSI,
   the maximum allowed transmission power for the symbols associated with the EHT-LTF and the payload,
   a maximum allowed transmission power for the symbols associated with the EHT-STF plus an adjustment which is dependent upon a modulation coding scheme (MCS) and a number of spatial streams (Nss), and
   the maximum allowed transmission power in the 6 GHZ LPI system.

10. An apparatus, comprising:
    a transceiver configured to transmit and receive wirelessly; and
    a processor coupled to the transceiver and configured to perform operations comprising:
       distributing subcarriers of a resource unit (RU) or a multi-RU (MRU) over a physical-layer protocol data unit (PPDU) bandwidth or a frequency subblock of a bandwidth to generate a distributed-tone RU (dRU) or a distributed MRU (dMRU) associated with an uplink (UL) trigger-based (TB) PPDU comprising at least an extremely-high-throughput (EHT) short training field (EHT-STF), an EHT long training field (EHT-LTF), and a payload of data; and
       transmitting, via the transceiver, the dRU or dMRU associated with the UL TB PPDU with transmission power control (TPC) such that symbols associated with the EHT-STF are transmitted with a first power and symbols associated with the EHT-LTF and the payload are transmitted with a second power,
    wherein an actual transmission power of the dRU or dMRU associated with the UL TB PPDU is limited to a minimum among:
       a downlink (DL) path loss (PL) plus a target received signal strength indicator (RSSI),
       a maximum allowed transmission power for the symbols associated with the EHT-LTF and the payload, and
       a maximum allowed transmission power in a 6 GHz low-power indoor (LPI) system.

11. The apparatus of claim 10, wherein, in an event that the first power and the second power are equal, the actual transmission power of the dRU or dMRU associated with the UL TB PPDU is limited to a minimum among:
    the DL PL plus the target RSSI,
    the maximum allowed transmission power for the symbols associated with the EHT-LTF and the payload,
    a maximum allowed transmission power for the symbols associated with the EHT-STF, and
    the maximum allowed transmission power in the 6 GHz LPI system.

12. The apparatus of claim 10, wherein the first power and the second power are equal.

13. The apparatus of claim 10, wherein the first power is less than or equal to the second power.

14. The apparatus of claim 10, wherein, in an event that the first power is less than the second power, the actual transmission power of the dRU or dMRU associated with the UL TB PPDU is limited to a minimum among:
the DL PL plus the target RSSI,
the maximum allowed transmission power for the symbols associated with the EHT-LTF and the payload,
a maximum allowed transmission power for the symbols associated with the EHT-STF plus an adjustment which is dependent upon a modulation coding scheme (MCS) and a number of spatial streams (Nss), and
the maximum allowed transmission power in the 6 GHz LPI system.

15. The apparatus of claim 10, wherein the first power is greater than or equal to the second power.

\* \* \* \* \*